C. SCHENCK.
HUB STRUCTURE FOR WHEELS.
APPLICATION FILED AUG. 13, 1917.

1,298,798.

Patented Apr. 1, 1919.

Inventor
Charles Schenck
By his atty. Samuel E. Darby

UNITED STATES PATENT OFFICE.

CHARLES SCHENCK, OF PHILADELPHIA, PENNSYLVANIA, ASSIGNOR TO BUDD WHEEL CORPORATION, OF PHILADELPHIA, PENNSYLVANIA, A CORPORATION OF PENNSYLVANIA.

HUB STRUCTURE FOR WHEELS.

1,298,798.  Specification of Letters Patent.  Patented Apr. 1, 1919.

Application filed August 13, 1917. Serial No. 185,998.

*To all whom it may concern:*

Be it known that I, CHARLES SCHENCK, a citizen of the United States, residing at Philadelphia, in the county of Philadelphia, State of Pennsylvania, have made a certain new and useful Invention in Hub Structures for Wheels, of which the following is a specification.

This invention relates to hub structures for wheels.

The object of the invention is to provide a hub structure for wheels, which is simple, economical to manufacture, and efficient in operation.

A further object of the invention is to provide a hub structure for wheels which permits the wheel to be readily detachable from its supporting hub and replaceable thereon, and when replaced upon its hub to be clamped and secured thereon.

A further object of the invention is to provide means for locking the detachable wheel upon its carrying hub, the locking means being released by the application of a spanner or other suitable tool to release the clamping nut.

Further objects of the invention will appear more fully hereinafter.

The invention consists substantially in the construction, combination, location, and relative arrangement of parts, all as will be more fully hereinafter set forth, as shown by the accompanying drawing and finally pointed out in the appended claims.

Referring to the drawing:—

The same part is designated by the same reference numeral wherever it appears throughout the several views.

In structures of vehicle wheels such as are employed extensively in connection with motor vehicles, and particularly with wheels of the wire spoke type it is desirable to provide means by which the wheel may be readily detachable and removable from its hub and quickly and easily applied thereto, and securely clamped in place in such manner as to be locked in position when applied. It is also desirable to provide means to prevent the accidental disengagement or release of the locking means employed by reason of the backing off of the clamping nut usually employed in connection with locking devices, through jolts, shocks, or otherwise. It is also desirable to provide a hub structure for detachable or demountable wheels which is simple, economical to manufacture, and efficient in operation. It is among the special purposes of my present invention to provide a hub structure for detachable demountable wheels which secures the advantages and desirable characteristics referred to by means of the characteristic features of construction, as will be more fully hereinafter set forth.

Figure 2:
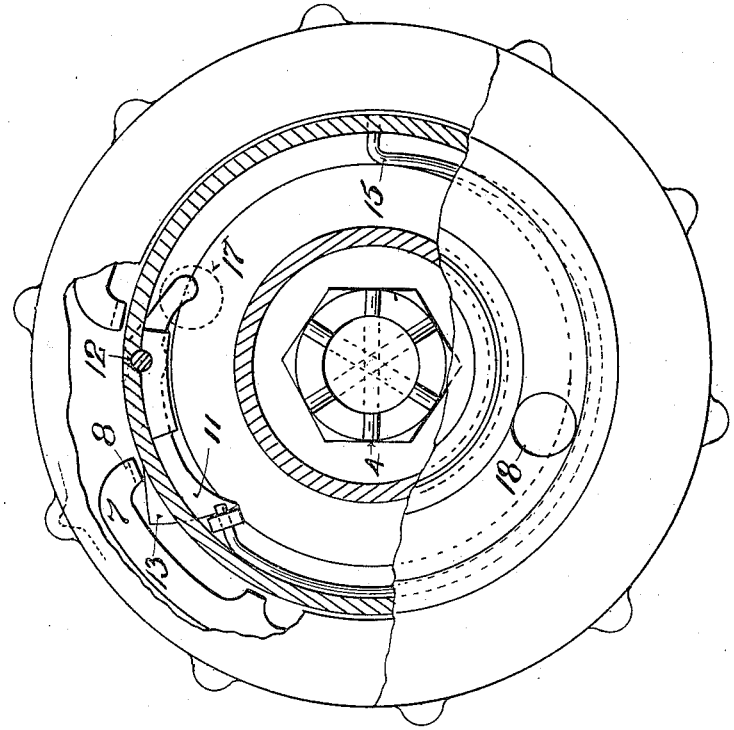
Fig. 2 is a partial sectional and end elevation view taken on the line 2, 2, Fig. 1, and looking in the direction of the arrows.
Figure 1:
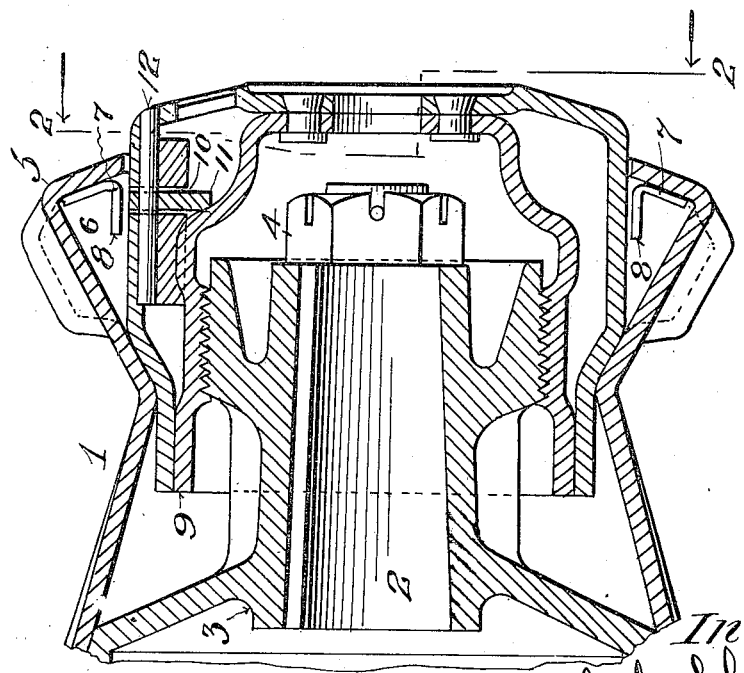
Figure 1 is a sectional view in side elevation of a hub structure embodying my invention.

Referring to the drawing:—1 designates the outer shell which forms a part of the wheel proper. The axle 2 is secured to an inner hub shell 3 and is held in place relative thereto by means of the nut 4. The outer shell 1 is outwardly flared as indicated at 5 to form a pocket 6 circumferentially therein, which accommodates a stop plate 7 which carries the stop lugs 8. The outer end of the hub shell 3 is provided with exterior screw threads to allow the hub cap 9 to screw thereover. The hub cap 9 I prefer to make in two shells, preferably of pressed steel of relatively different diameter, and telescoped the one over the other, and suitably secured together at their inner and outer ends in any desired manner. In the outer shell of the pressed steel hub cap is located a transversely extending slot 10 to receive the safety latch 11. The slot 10 as shown is parallel to the face of the hub cap. The safety latch is pivoted on a pin 12 extending at right angles to the face of the cap, which pivot pin is located near the tail end of the latch as clearly shown in Fig. 2. The locking portion 13 of the latch where it engages the stop plate teeth of lug 8 is made circumferential relative to the pin 12 to provide a positive stop and a means for readily disengaging the locking portion of the latch from the teeth 8 when the latch is rocked about the pin 12 as its center. A curved spring 15 anchored in the hub cap and secured to the latch 11 as shown normally holds the latch in its locking position relative to the stop plate teeth 8. The outer shell of the pressed steel hub cap is provided with two holes 17 and 18 for wrench pins forming part of a wrench or spanner of any desired construction. Opposite one of the holes, namely, 17, is located the tail of the safety latch 11. As the pointed pins of the wrench enter the holes 17 and 18 of the hub cap the pin entering the hole 17 engages the tail of the latch moving it outwardly from the center of the hub cap. This depresses the locking portion 13 of the latch against action of the spring 15 about the pivot pin 12 as a center thereby bringing it flush with the outer surface of the hub cap. The hub cap may then be readily removed by turning it on its threads on the hub shell 3. In putting on the hub cap it is turned up on the threads of the hub shell and after being brought to a seat the wrench is withdrawn. The spring forces the locking portion 13 of the latch 11 outwardly from the surface of the hub cap. Any tendency for the hub cap to back off is prevented by the safety latch engaging with the teeth of the stop plate. With this structure of hub a short movement of the tail end of the latch brings it to the disengaging position due to the proportioning of the latch and the location of its pivot point. The moment the wrench is withdrawn the spring automatically moves the latch into locking position and holds it there. The locking portion 13 of the latch 11 presses against the stop plate teeth 8 and there is no opportunity for it to disengage as the front of the latch locking surface is made circumferential relative to the pivot point 12 thereof. Any tendency for the hub cap to back off causes the latch to press harder against the stop plate teeth as will be readily understood.

Having now set forth the objects and nature of my invention, and having shown and described a structure embodying the characteristic features thereof, what I claim as new and useful and of my own invention and desire to secure by Letters Patent, is:—

1. In a hub structure, the combination with a hub shell and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot at its approximate center, and provided with a projecting portion at one side of its pivot adapted to extend out of said slot into engaging relation with said stop plate, the portion of the latch on the other side of its pivot being formed into a relatively small tail portion, said cap being provided with a pair of holes, one of said holes being positioned opposite the tail portion of said latch, and off center, relative thereto, substantially as and for the purpose described.

2. In a hub structure, the combination with a hub shell and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot at its approximate center on an axis transverse to said slot, and provided with a projecting portion at one side of its pivot adapted to extend through said slot into engaging relation with said stop plate, the portion of the latch on the other side of its pivot being formed into a relatively small tail portion, said cap being provided with a pair of holes, one of said holes being positioned opposite the tail portion of said latch, and off center, relative thereto, and means for normally and yieldingly projecting said latch into engagement with said stop plate.

3. In a hub structure, the combination with a hub shell and an outer shell, of a hub cap adapted to fit on said hub shell to hold said outer shell in position thereon, and provided with a transverse slot therein parallel to the plane of the face of said cap, a stop plate carried by said outer shell to extend circumferentially around said cap in the plane of said slot, a latch located within the cap and pivotally mounted at its approximate center upon an axis at right angles to the end face of the cap, and provided with a projecting portion at one side of its pivot adapted to extend through said slot into engaging relation with said stop plate, the portion of the latch on the other side of its pivot being formed into a relatively small tail portion, said cap being provided with a pair of holes, one of said holes being positioned opposite the tail portion of said latch, and off center, relative thereto, and a spring extending around said cap for normally and yieldingly projecting said latch into engagement with said stop plate.

4. In a hub structure, the combination with a hub shell and an outer shell, of a hub cap adapted to fit on said hub shell to hold said outer shell in position thereon, and provided with a slot therein parallel to the plane of the face of said cap, a stop plate carried by said outer shell to extend circumferentially around said cap in the plane of said slot, a latch pivotally mounted in said slot at its approximate center upon an axis at right angles to the plane of said slot, and provided with a projecting portion at one side of its pivot adapted to extend through said slot into engaging relation with said stop plate, the portion of the latch on the other side of its pivot being formed into a relatively small tail portion, said cap being provided with a pair of holes, one of said holes being positioned opposite the tail portion of said latch, and off center, relative thereto, and a spring located within, and extending around said cap, and secured at one end to said latch and anchored at its other end for normally and yieldingly projecting said latch into engagement with said stop plate.

5. In a hub structure, the combination with an outer or wheel shell, a hub shell, a cap formed of two shell portions telescoped, the one over the other, and secured together, one of said cap shells engaging said hub shell and the other of said cap shells engaging said outer or wheel shell to retain the latter in place.

6. In a hub structure, the combination with an outer or wheel shell, a hub shell, a cap formed in two shell portions of relatively different diameters and telescoped the one over the other and secured together, one of said cap shell portions engaging said hub shell and the other engaging said outer or wheel shell, and a locking latch disposed in the space between said cap shells and carried by said outer cap shell, and operating to lock said cap.

7. In a hub structure, the combination with an outer or wheel shell, a hub shell, a cap formed of an outer and an inner shell portion telescoped and secured together to form a space between them, said inner cap shell engaging the hub shell and said outer cap shell engaging the outer or wheel shell and a locking device disposed between said cap shells and adapted to detachably engage said outer or wheel shell.

8. In a hub structure, the combination with an outer or wheel shell, a hub shell, a cap formed of an outer and inner shell portion telescoped over each other and secured together at their ends, said inner cap shell engaging said hub shell and said outer cap shell engaging said outer or wheel shell, and a locking device carried by said outer cap shell and located between the telescoped cap shells and adapted to engage said outer or wheel shell.

9. The combination with a wheel and a receiving hub therefor, a cap formed of outer and inner shell portions of relatively different diameters and telescoped the one over the other and secured together at their ends, said outer cap shell having a transversely extending slot through the wall thereof, a latch disposed in the space between said cap shells and pivotally mounted therein and having a portion to project through said slot and engaging device carried by the wheel for coöperation with said latch to detachably lock said cap, said cap engaging the receiving hub and the wheel respectively to detachably retain the latter in place.

10. In a hub structure, the combination with an outer or wheel shell, a hub shell, a cap formed of an outer and an inner shell portion telescoped and secured together to form a space between them, said inner cap shell engaging the hub shell and said outer cap shell engaging the outer or wheel shell, and a locking device disposed between said cap shells and adapted to detachably engage said outer or wheel shell, said locking device being positioned entirely without the inner shell.

In testimony whereof I have hereunto set my hand on this 7th day of August A. D., 1917.

CHARLES SCHENCK.